United States Patent [19]

Nowack

[11] Patent Number: 5,642,428

[45] Date of Patent: Jun. 24, 1997

[54] METHOD AND APPARATUS FOR DETERMINING PLAYBACK VOLUME IN A MESSAGING SYSTEM

[75] Inventor: James J. Nowack, Sunnyvale, Calif.

[73] Assignee: Siemens Business Communication Systems, Inc., Santa Clara, Calif.

[21] Appl. No.: 12,608

[22] Filed: Feb. 2, 1993

Related U.S. Application Data

[63] Continuation of Ser. No. 657,021, Feb. 19, 1991, abandoned.

[51] Int. Cl.$^6$ .................................................. H03G 3/00
[52] U.S. Cl. ......................... 381/107; 379/68; 379/88
[58] Field of Search ........................... 381/56, 57, 94, 381/110, 107, 104; 379/68, 88, 89

[56] References Cited

U.S. PATENT DOCUMENTS

| | | | |
|---|---|---|---|
| 4,256,389 | 3/1981 | Engebretson | 352/5 |
| 4,461,025 | 7/1984 | Franklin | 381/56 |
| 4,558,459 | 12/1985 | Noso et al. | 381/57 |
| 4,703,507 | 10/1987 | Holden | 381/94 |
| 4,792,974 | 12/1988 | Chace . | |
| 4,910,797 | 3/1990 | Min et al. | 381/108 |

*Primary Examiner*—Forester W. Isen

[57] ABSTRACT

Method and apparatus for use in conjunction with voice messaging systems for determining playback volume of a message so that a good representation is provided for a voice-related portion of the message and the playback volume of a loud sound is reduced. In a preferred embodiment of the present invention, the log mean square power (MSP) of the message is determined while the message is being recorded and an MSP value for use in determining the playback volume is determined by analysis of the values received near the end of the message.

8 Claims, 2 Drawing Sheets

FIG. 2

```
        /* INITIALIZE MSPBUFFER[] TO ZERO */
101:        FOR I = 0 TO 3 {    MSPBUFFER[I] = 0 }
        /* ESTABLISH PREDETERMINED VALUES FOR LATER USE */
102:        SILENCE_THRESHOLD = PREDETERMINED SILENCE THRESHOLD
            LOUD_THRESHOLD = PREDETERMINED LOUDNESS THRESHOLD
            DEFAULTMSP = PREDETERMINED DEFAULT
        /* DO ONCE A SECOND */
103:    /*  MSPBUFFER[] = MSP CALCULATION RESULT
        /* DETERMINE MSP VALUE BEFORE PLAYBACK */
        /* MESSAGE DURATION LESS THAN ONE SECOND */
104:        IF MESSAGE_DURATION < 1 SECOND {
105:        MSPPLAYBACK = DEFAULTMSP) }
        /* MESSAGE DURATION FROM 1 TO 2 SECONDS */
106:        IF 1 <= MESSAGE_DURATION < 2 {
107:        MSPPLAYBACK = ONLY VALID MSP VALUE IN MSPBUFFER }
        /* MESSAGE DURATION LONGER THAN 2 SECONDS */
        /* DETERMINE THE 2 LARGEST VALUES IN MSPBUFFER */
108:        CALL MAXMSP(MSPBUFFER, MSP1, MSP2)
            /* MSP1 IS GREATER THAN OR EQUAL TO MSP2 */
110:        IF (MSP1 >= LOUD_THRESHOLD && SILENCE_THRESHOLD <= MSP2
                && MSP2 < LOUD_THRESHOLD) {
111:            MSPPLAYBACK = MSP2}
112:            ELSE { MSPPLAYBACK = MSP1 }
        /* ADJUST MESSAGE VOLUME AT PLAYBACK TIME */
113:        IF MSPPLAYBACK < DEFAULTMSP {INCREASE PLAYBACK VOLUME}
114:        IF MSPPLAYBACK > DEFAULTMSP {DECREASE PLAYBACK VOLUME}
```

METHOD AND APPARATUS FOR DETERMINING PLAYBACK VOLUME IN A MESSAGING SYSTEM

CROSS REFERENCE TO RELATED APPLICATION

This is a continuation of Ser. No. 07/657,021 filed Feb. 19, 1991, now abandoned.

TECHNICAL FIELD OF THE INVENTION

The present invention pertains to method and apparatus for determining playback volume of messages in a messaging system and, in particular, to method and apparatus for determining the playback volume of a message so that a good representation is provided for a voice-related portion of the message and the playback volume of a loud sound is reduced.

BACKGROUND OF THE INVENTION

Voice store and forward messaging systems which are available in the art such as, for example, a ROLM Phone-Mail voice store and forward messaging system manufactured by ROLM Systems of Santa Clara, Calif., record incoming telephone messages for playback to a system user at a later time. A typical such telephone message comprises a human voice talking continuously at a moderate volume.

In general, a message can be arbitrarily long and it is comprised of voice-related portions, periods of silence, and white noise. Occasionally, however, a message contains unexpectedly loud sounds. One example of such a loud sound is the loud sound that sometimes results when a calling party sets down a handset at the end of a call. This loud sound, along with miscellaneous telephony noises such as disconnect signals, is known as a "hang-up clunk."

Presently available voice store and forward messaging systems are deficient in relation to the methods they utilize in determining playback volume for messages. For example, some presently available systems analyze messages to determine playback volume but provide playback volumes which are too high. This causes a problem for messages which contain loud sounds because the resulting large playback volume of loud sounds can be discomforting or harmful to a listener's ear. Other presently available systems analyze messages to determine playback volume but provide playback volumes which are too low. This causes a problem in that voice-related portions of some messages may become unintelligible when the messages are played back. Lastly, still other presently available systems do not analyze messages to determine playback volume and merely play back the message at the same volume it had when it was received. This causes a problem for messages which contain loud sounds because the playback volume of such loud sounds can be discomforting or harmful to a listener's ear and this causes a problem for messages which have a low volume because the playback volume is too low for suitably intelligible sound.

As a result of the above-described problems concerning messaging systems which are presently available in the prior art, there is a need for method and apparatus for use in conjunction with voice messaging systems for determining playback volume of a message so that a good representation is provided for a voice-related portion of the message and the playback volume of a loud sound is reduced.

SUMMARY OF THE INVENTION

Embodiments of the present invention advantageously satisfy the above-identified need in the art and provide method and apparatus for use in conjunction with a voice messaging system for determining playback volume of a message so that a good representation is provided for a voice-related portion of the message and the playback volume of a loud sound is reduced. In accordance with the present invention, measurements of a measure of volume for a message are obtained for use in determining an appropriate playback volume for the message. In one particular embodiment of the present invention, the measure of volume is a running average of the log mean square power (MSP) of the message. In this embodiment, the MSP values are obtained while the message is received by the messaging system. At the end of the message, the MSP values are analyzed to determine an MSP value which can be used to adjust the playback volume of the message to provide a good representation of the voice portion of the message, if any, and to reduce the effect of loud sounds such as the "hang-up clunk." Further, in accordance with this embodiment, the MSP values obtained from a predetermined portion of the end of message are used to determine the representative MSP value.

BRIEF DESCRIPTION OF THE DRAWINGS

A complete understanding of the present invention may be gained by considering the following detailed description in conjunction with the accompanying drawing, in which:

FIG. 2 is a listing of pseudocode for use in fabricating a preferred embodiment of an algorithm for use in the apparatus shown in FIG. 1 for adjusting playback volume of voice messages.

DETAILED DESCRIPTION

Figure 1:
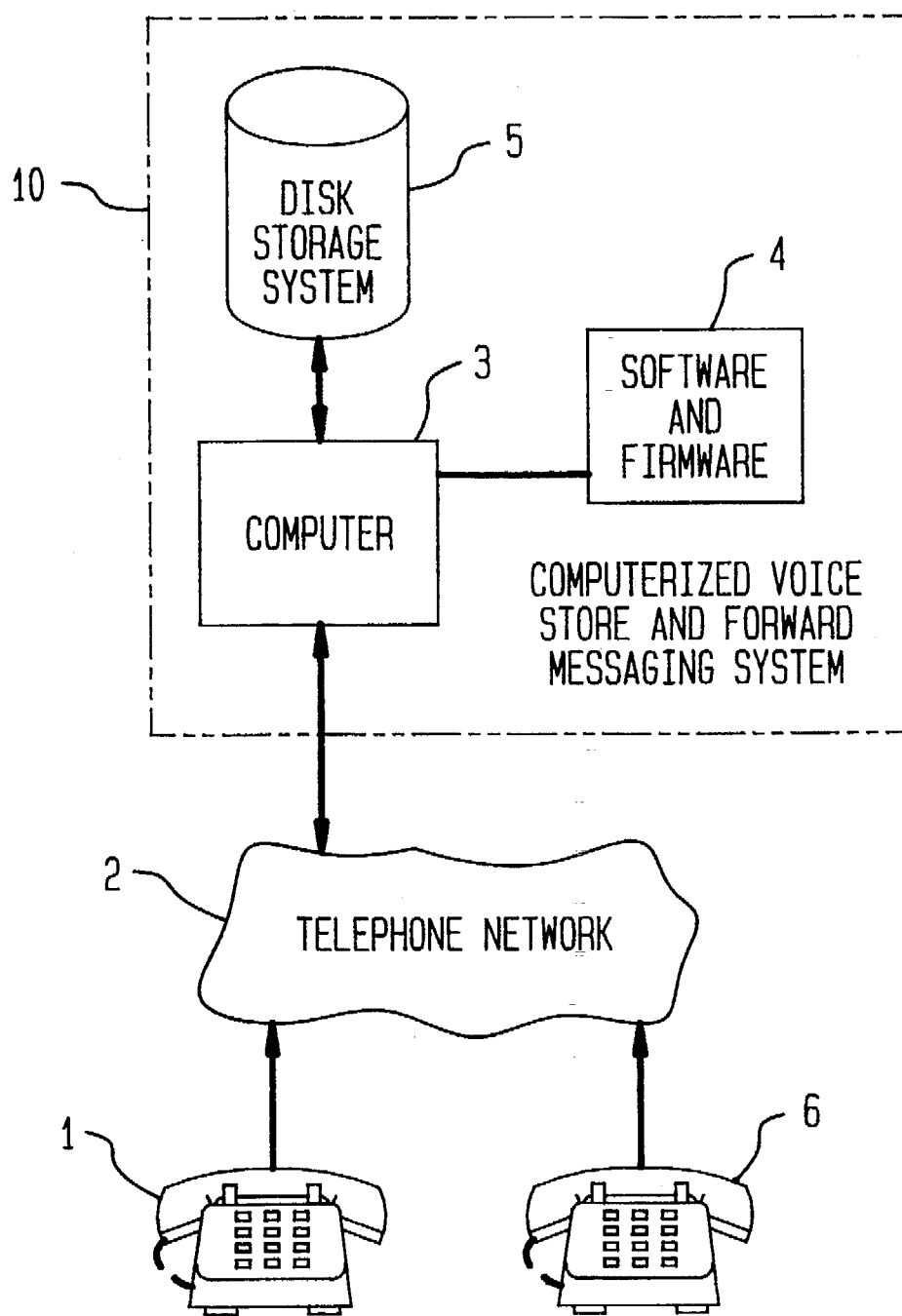
FIG. 1 shows a block diagram of a voice store and forward messaging system which is fabricated in accordance with the present invention.

FIG. 1 is a block diagram of voice store and forward messaging system 10 and which illustrates its mode of interaction with users. As shown in FIG. 1, a calling party using telephone 1 places a telephone call which is routed by telephone network 2 to voice store and forward messaging system 10. Whenever the calling party using telephone 1 elects to record a message in system 10, computer 3 performs transformations on the message which are well known to those of ordinary skill in the art for the purpose of storing a digital representation of the message on disk storage system 5 and, in accordance with the present invention, computer 3, in conjunction with input from software and firmware module 4, makes measurements of a measure of message volume and analyzes these measurements in a manner which will be described in further detail below. Finally, computer 3 transmits the digital representation of the message and the results of the message volume analysis to disk storage system 5 for storage therein.

Voice messages typically fall into one of the following categories: (a) continuous speech; (b) a leading period of silence which is followed by continuous speech; (c) a leading period of silence which is followed by continuous speech, all of which is terminated by a loud disconnect sound resulting when the calling party sets down a handset at the end of a call—this loud sound, along with miscellaneous telephony noises such as disconnect signals, is referred to as a "hang-up" clunk; and (d) a leading period of silence which is terminated by a "hang-up" clunk. In addition, such voice messages typically contain white noise and can be of arbitrary length.

In accordance with the present invention, the following are stored on disk storage system 5 for a message: (a) a digital representation of the message and (b) a measure of message volume which is representative of the voice portion of the entire message, which measure has been calculated by computer 3 in conjunction with input from software and firmware module 4. In a preferred embodiment of the present invention, the measure of message volume which is stored on disk storage system 5 is a log mean square power (MSP) value which has been determined by analysis of a number of such measures of the message volume, see *Modern Digital and Analog Communication Systems*, by B. P. Lathi, CBS College Publishing (1983), at p. 99 for a description of one well known method of calculating MSP. As will be described below, the measures of message volume are utilized, in accordance with the present invention, to determine which portion of a message is most likely voice-related and to determine a measure of message volume which is used at playback to ensure that the message has a pleasant, intelligible playback volume.

In a preferred embodiment of the present invention, a running average of the log mean square power of a voice message, i.e., MSP, is examined in accordance with an algorithm described below. An MSP value is calculated once a second while the message is being received. If the message is comprised of silence or background noise, the calculated MSP value therefor will be very close to zero. However, if the message is extremely loud, for example, when a portion of a message is created by a "hang-up clunk" which occurs when a handset is slammed down, the calculated MSP value will be large. However, since the MSP value which is calculated in accordance with the present invention is a running average, messages that: (a) begin with silence, (b) are followed by one or two seconds of voice, and (c) end when a telephone receiver is slammed down, will have MSP values that increase. Further, since the MSP calculation stabilizes as a messages gets longer, silence and loud noises will not substantially change the MSP value of a message of long duration.

Referring back to FIG. 1, at some point in time after the message was received and stored, a calling party using telephone 6 places a telephone call to voice store and forward messaging system 10 and the calling party requests system 10 to play the stored message. In response to this request, computer 3 retrieves the digital representation of the message and the measure of message volume from disk storage system 5. Computer 3 transforms the message, in accordance with methods which are well known to those of ordinary skill in the art, into a form which is suitable for playback to the calling party at telephone 6. Further, computer 3, in conjunction with input from software and firmware module 4, uses the measure of message volume to adjust the playback volume of the message in accordance with the present invention.

The following provides an overview of the algorithm which is utilized to fabricate a preferred embodiment of the present invention. This will be followed by a detailed description of the algorithm in connection with a listing of pseudocode shown in FIG. 2.

The algorithm utilizes a circular buffer to store values of MSP which are calculated as the message is received. In the preferred embodiment, the circular buffer stores four values of MSP. Although the circular buffer may store a different number of values, I have found by experimentation that the use of four values provides satisfactory results in the suppression of loud noises.

The circular buffer is used to store MSP values which are provided once a second and, when the entire message has been received, the circular buffer contains MSP values for the last four seconds of the message. I have chosen to examine the last four seconds of a message because, as a result of experimentation, I have determined that the running average of MSP can fluctuate and stabilize during a time window of this size and I have discovered that most telephony noises and hang-up clunks last less than four seconds. As such, the use of a four second window at the end of a message ensures that at least one MSP value which has been captured in the buffer corresponds to something other than a hang-up clunk.

The algorithm determines which of the MSP values that are stored in the circular buffer most likely represents a voice-related portion of the message and determines a value of MSP that can be used to provide a playback volume that substantially protects a listener from loud sounds. In accordance with the algorithm, there are three decision conditions. Condition 1 occurs whenever the circular buffer is empty, i.e., it contains no MSP values at the end of a message. This occurs whenever the message was less than one second in length. Condition 2 occurs whenever the circular buffer contains one MSP value at the end of the message. This occurs whenever the message is between one and two seconds in length. Lastly, condition 3 occurs whenever the circular buffer contains two, three, or four MSP values. This occurs whenever the message is greater than two seconds in length. The algorithm does the following in response to the occurrence of one of the above-described conditions 1, 2, or 3.

Whenever condition 1 occurs and the circular buffer contains no MSP values, a predetermined default MSP value is stored on disk storage system 5 and, as will be discussed below, the playback volume of the message will not be changed. The reason for this is that since the message is less than one second in length, it is not likely to contain intelligible voice. Although a message of this length could contain loud sounds, a listener would only be exposed to it for a relatively short length of time. Further, I have performed experiments which indicate that it is difficult to produce a message comprised of harsh, loud sounds that are less than one second in length.

Whenever condition 2 occurs and the circular buffer contains one MSP value, the MSP value in the circular buffer is stored on disk storage system 5. Later, when the message is to be played back, the stored MSP value will compared to the predetermined default value. If the MSP value from the circular buffer is greater than the predetermined default value, then the message playback volume will be decreased. However, if the MSP value from the circular buffer is less than the predetermined default value, then the message playback volume will be increased. Lastly, if the MSP value is substantially equal to the predetermined default value, then the message playback volume will not be changed. In accordance with a preferred embodiment of the present invention, if the stored MSP value is greater than the predetermined default value, then the playback volume will be decreased by 0.75*(MSP—default) decibels, whereas, if the stored MSP value is less than the predetermined default value, then the playback volume will be increased by 0.75*(default—MSP) decibels.

The following sets forth the reasons for taking the above-described course of action for condition 2. For condition 2, the message is between one and two seconds in length and messages of this length are so short that it is unlikely that they contain voice-related portions and loud sounds which are non-voice-related. For example, a "hang-up" clunk typically lasts for at least ⅚ of a second. In general these messages tend to contain silence, voice-related sound, or a loud, non-voice-related sound. In any of these cases, the MSP value in the circular buffer would be representative of the volume of the message. As a result, by following the actions set forth above, if the message were a voice message, it would be played back at a volume which is conducive to intelligible voice whereas, if the the message were a loud, non-voice related sound, the playback volume would be decreased.

Whenever condition 3 occurs and the circular buffer contains two, three, or four MSP values, the two largest MSP values in the circular buffer are selected for further analysis. The following tests are made: (a) if these two largest MSP values are equal, then this MSP value is stored on disk storage system 5 for later use in determining the message playback volume, otherwise go on to tests (b) through (e) which deal with cases wherein the two largest MSP values are not equal; (b) if both of these MSP values are greater than a predetermined loudness threshold, then the larger value of these MSP values is stored for later use in determining the message playback volume; (c) if one of these MSP values is greater than the predetermined loudness threshold and the other one of these MSP values is greater than a predetermined silence threshold, then the smaller of these MSP values is stored for later use in determining the message playback volume; (d) if one of these MSP values is lower than the predetermined silence threshold, then the larger value of these MSP values is stored for later use in determining the message playback volume; and (e) if both of these MSP values are between the predetermined silence threshold and the predetermined loudness threshold, then the larger of these MSP values is stored for later use in determining the message playback volume. Later, when the message is to be played back, the stored MSP value will compared to the predetermined default value. If the stored MSP value is greater than the predetermined default value, then the message playback volume will be decreased. However, if the stored MSP value is less than the predetermined default value, then the message playback volume will be increased. Lastly, if the stored MSP value is substantially equal to the predetermined default value, then the message playback volume will not be changed.

The following sets forth the reasons for taking the above-described course of action for condition 3. These messages are greater than two seconds in length and, as a result, the messages could contain all or any of the message properties identified above in discussing conditions 1 and 2. Thus, in accordance with the algorithm, a predetermined loudness threshold is used to identify loud, hang-up clunks and a predetermined silence threshold is used to identify silence. I have determined that if the largest two MSP values are equal, the message has a semblance of volume stability and, as a result, this MSP value is representative of the volume of the message. Thus, in accordance with the algorithm, that value of MSP is stored for later use in determining the message playback volume. I have further determined that if both of these MSP values are greater than a predetermined loudness threshold, then the majority of the message is too loud and should be softened on playback. This is accomplished by storing the larger of these MSP values for later use in determining the message playback volume. I have still further determined that if only one of these MSP values is greater than the predetermined loudness threshold and the other one of these MSP values is greater than the predetermined silence threshold, then the larger MSP value is indicative of a loud hang-up clunk and the other MSP value is indicative of a voice portion of the message. In this case, the smaller, voice-related MSP value is stored for later use in determining the message playback volume. As a result, the message playback volume will be lowered because the voice-related MSP value is larger than the predetermined silence threshold and the predetermined default value. Thus, the loud hang-up clunk will be played back at a lower volume than that it had when it was received. I have yet still further determined that if one of these MSP values is lower than the predetermined silence threshold, then the other MSP value should be stored for later use in determining the message playback volume to avoid amplifying the voice-related or noise-related portions of the message as if they were silence. I have yet again still further determined that if both of these MSP values are between the predetermined silence threshold and the predetermined loudness threshold, then the message does not contain silence or loud noises. As a result, the larger value of MSP is stored for later use in determining the message playback volume since the larger MSP value is more representative of the message.

FIG. 2 is a listing of pseudocode for use in fabricating the preferred embodiment of the algorithm.

At line 101, circular buffer MSPbuffer[ ], having four locations, is initialized to 0. Then, control is transferred to line 102.

At line 102, predetermined thresholds are initialized to predetermined values. The predetermined values for Silence_Threshold and Loud_Threshold are chosen in accordance with experiments which I performed to obtain values which effectively adjust the message playback volume so that the voice-related portions of messages have a pleasant, intelligible volume and so that the playback volume of loud sounds is reduced so as to minimize discomfort of a listener. Further, a default value is used, as will be described below, in determining the message playback volume. Then, control is transferred to line 103.

At line 103, as a message is input to the messaging system, an MSP value is calculated—in accordance with any one of a number of methods which are well known to those of ordinary skill in the art—once a second and these values are stored in circular buffer MSPBuffer[ ]. Then, control is transferred to a control routine (not shown) until the complete message has been received by the messaging system. At that time, control is transferred back to this analysis routine at line 104.

At line 104, a complete message has been received. A test is made to determine whether the message length was less than one second. If so, control is transferred to line 105, otherwise, control is transferred to line 106.

At line 105, message playback parameter MSPPlayBack which is stored for later use in determining the message playback volume is set equal to the predetermined default. Then, control is transferred to the control routine to await the next message to be recorded or to await the next message to be played back. When a new message is to be recorded, control is transferred to line 101 or when a message is to be played back, control is transferred to line 113.

At line 106, a test is made to determine whether the message length was greater than or equal to one second and less than two seconds. If so, control is transferred to line 107, otherwise, control is transferred to line 108.

At line 107, message playback parameter MSPPlayBack which is stored for later use in determining the message playback volume is set equal to the single MSP value in circular buffer MSPBuffer. Then, control is transferred to the control routine to await the next message to be recorded or to await the next message to be played back. When a new message is to be recorded, control is transferred to line 101 or when a message is to be played back, control is transferred to line 113.

At line 108, the message length is greater than or equal to two seconds and routine MaxMSP(MSPBuffer, MSP1, MSP2) is invoked to determine the two largest MSP values in circular buffer MSPBuffer[ ], MSP1 being the larger of the two largest values and MSP2 being the smaller one. It is well known to those of ordinary skill in the art how to generate a routine like MaxMSP(MSPBuffer, MSP1, MSP2). Then, control is transferred to line 110.

At line 110, a test is made to determine whether the first of the two largest values MSP1 is greater than or equal to predetermined loudness threshold LOUD_THRESHOLD and the second of the two largest values MSP2 is greater than or equal to predetermined silence threshold SILENCE_THRESHOLD and MSP2 is less than LOUD_THRESHOLD. If so, control is transfer to line 111, otherwise, control is transferred to line 112.

At line 111, message playback parameter MSPPlayBack which is stored for later use in determining the message playback volume is set equal to MSP2. Then, control is transferred to the control routine to await the next message to be recorded or to await the next message to be played back. When a new message is to be recorded, control is transferred to line 101 or when a message is to be played back, control is transferred to line 113.

At line 112, the message playback parameter MSPPlayBack which is stored for later use in determining the message playback volume is set equal to MSP1. Then, control is transferred to the control routine to await the next message to be recorded or to await the next message to be played back. When a new message is to be recorded, control is transferred to line 101 or when a message is to be played back, control is transferred to line 113.

At line 113, a message is to be played back and the message playback volume must be determined. A test is made to determine whether message playback parameter MSPPlayBack for the message is less than predetermined default DefaultMSP. If so, the message playback volume is increased by 0.75*(DefaultMSP—MSPPlayBack) decibels, otherwise, control is transferred to line 114.

At line 114, a test is made to determine whether MSPPlayBack is greater than DefaultMSP. If so, the message playback volume is decreased by 0.75*(MSPPlayBack—DefaultMSP) decibels; otherwise the message is played back without changing its volume.

Note should be taken of the following. First, in the test shown at line 110, there is only one case where the smaller of the two largest MSP values is stored for later use in determining the message playback volume. This occurs whenever the larger of the two values is larger than the predetermined loudness threshold and the smaller one is not. As was discussed above, this is done in this case because the smaller value is more representative of the voice-related portion of the message than the larger one, the larger one probably being caused by a hang-up clunk. Hence, in accordance with this, the clunk will be softened. Second, if the smaller of the two values is below the predetermined silence threshold, then the larger value is stored for later use. As a result, this prevents message playback volume from being increased by characterizing the message with an MSP value that might be silence if some other portion of the message is louder. Third, as one can readily appreciate from the above, in accordance with the preferred embodiment of the present invention, message playback parameter MSP-PlayBack is calculated once for each message and is later used, without recalculation, to adjust message playback volume. This embodiment is advantageous in that it provides adequate performance while requiring a relatively small amount of processing power. Of course, those of ordinary skill in the art will appreciate that the above-described algorithm can be used if a message is broken down into a number of pieces and the algorithm is applied to each of the pieces independently.

Those skilled in the art should understand that the above-described algorithm may be implemented in software and firmware module 4 in any one of many processor and memory configurations which are well known in the art.

Those skilled in the art recognize that further embodiments of the present invention may be made without departing from its teachings. For example, calculations of measures of volume other than the log mean square power (MSP) may be used to provide representations of dynamic volume changes in a message to determine a representative volume for the message. Further, the MSP values need not be calculated when the message is recorded and the MSP values could be calculated at various time intervals such as, for example, every 0.5 seconds. The algorithm could be implemented by hardware only. Still further, software and firmware module 4 may be implemented on any number of microprocessors which are commercially available such as processors which are commercially available from Intel. Yet still further, the algorithm for determining an appropriate value of measure of message volume could utilize more or less than the four valued buffer described above.

What is claimed is:

1. A method for adjusting playback volume of a message received by a messaging system, which method comprises the steps of:

determining a measure of message volume at predetermined points of at least a portion of the message;

analyzing a predetermined portion of the measures to determine a single measure of the message volume which is representative of a voice-related portion of the portion of the message;

storing the single measure of the message volume along with a representation of the message;

retrieving the single measure of the message volume and the representation of the message; and generating the message from the representation and adjusting the playback volume of the entire message in light of the single representative measure.

2. A method for adjusting playback volume of a message received by a messaging system, which method comprises the steps of:

determining a measure of message volume at predetermined points of at least a portion of the message by determining a running average of the log mean square power (MSP) at predetermined points of at least a portion of the message;

analyzing a predetermined portion of the measures to determine a measure of the message volume which is representative of a voice-related portion of the portion of the message; and adjusting the playback volume of the message in light of the representative measure.

3. The method of claim 1 wherein the step of determining a measure at predetermined points comprises the step of determining a measure of message volume at predetermined points of the entire message.

4. The method of claim 3 wherein the step of analyzing comprises analyzing the measures which were determined within a predetermined interval from an end of the message.

5. The method of claim 3 wherein the step of determining a measure comprises determining a measure of message volume at one second intervals.

6. The method of claim 4 wherein the step of determining a measure comprises determining a measure of message volume at one second intervals.

7. The method of claim 1 wherein the step of adjusting the playback volume comprises the step of decreasing the playback volume of the entire message if the single representative measure is greater than a predetermined default and increasing the playback volume of the entire message if the single representative measure is less than the predetermined default.

8. Apparatus for adjusting playback volume of a message received by a messaging system, which apparatus comprises:

means for determining a measure of message volume at predetermined points of at least a portion of the message;

means for analyzing a predetermined portion of the measures to determine a single measure of the message volume which is representative of a voice-related portion of the portion of the message;

means for storing the single measure of the message volume along with a representation of the message;

means for retrieving the single measure of the message volume and the representation of the message; and means for generating the message from the representation and for adjusting the playback volume of the entire message in light of the single representative measure.

* * * * *